FIG. I.

INVENTORS
Jack L. Williams
James H. Roll

By Watson, Cole, Grindle & Watson
ATTORNEYS

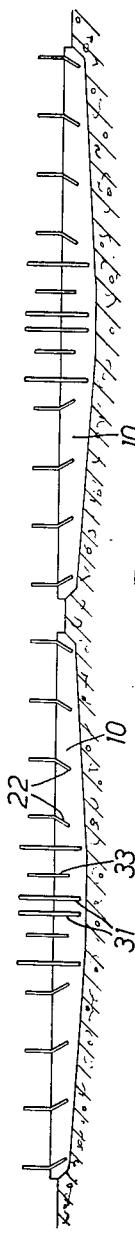
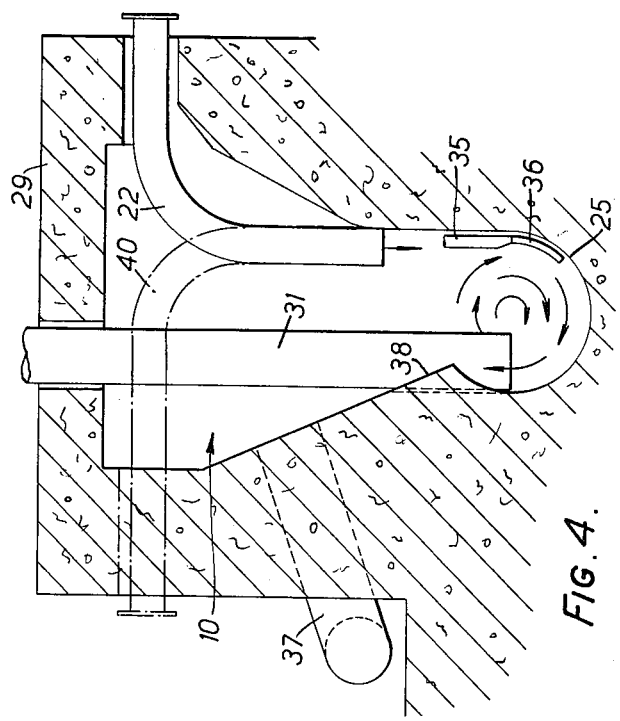
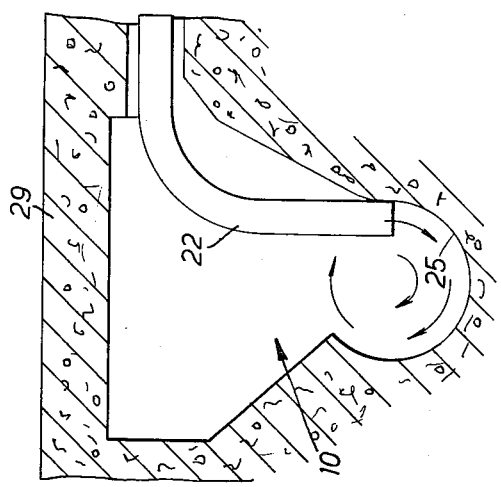
FIG. 3.
FIG. 4.
FIG. 5.
INVENTORS
Jack L. Williams
James H. Roll
By Watson, Cole, Grindle & Watson
ATTORNEYS

United States Patent Office 3,232,671
Patented Feb. 1, 1966

3,232,671
CONVEYING OF SLURRY
Jack Lilwall Williams and James Harvey Roll, Newcastle-upon-Tyne, England, assignors to Merz & McLellan Services Limited, Newcastle-upon-Tyne, England, a company of Great Britain
Filed July 1, 1963, Ser. No. 292,003
2 Claims. (Cl. 302—14)

This invention relates to the conveying of slurry, and is particularly, though not exclusively, applicable to the disposal of ash from power stations.

According to one aspect of the invention equipment for conveying a slurry in a generally horizontal direction includes a generally horizontal channel or trough and means for causing the slurry to travel along it in helical paths.

The slurry may be delivered to the trough from an inlet in a direction having a component tangential and a component parallel to the axis of the trough. For collecting slurry from a number of positions two or more inlets may be spaced apart along the length of the trough.

In addition water jets may be provided at one or more points in the trough to maintain or include helical motion of the slurry in the trough. Alternatively or in addition air jets may be provided for the same purpose and/or to impart a lifting effect to the solids in the slurry.

The section of the trough may vary, but in one preferred form it comprises a curved bottom and an upper part diverging outwards. The curved bottom may correspond to at least half a circle, preferably more than half a circle. Preferably the trough is provided with a cover.

One or each inlet for slurry may communicate with an ejector to which powder is supplied together with water under pressure to entrain and wet the powder to form a slurry and propel the slurry on its way to the trough.

In an important application of the invention the slurry travels along the trough to at least one pump or ejector intake.

Another aspect of the invention is concerned with the method of conveying a slurry. Thus in utilising the equipment, in particular for collecting slurry from a number of points to the intake of a pump, it is preferred to adjust the supply in relation to the pump delivery so that the level in the trough will in general be above the mouths of the inlets. Moreover, it is preferred to maintain a flow of liquid along the trough whether or not a supply of powder is being fed into it to form a slurry. In particular where the powder is obtained from two or more sources, change-over cocks may be provided so that when the water supply to the trough by one route is discontinued the supply by another route will immediately begin.

The invention may be performed in various ways but one specific embodiment will be described by way of example with reference to the accompanying drawings in which:

FIGURE 3 is a diagrammatic longitudinal sectional elevation of the troughs, and

Figure 1:
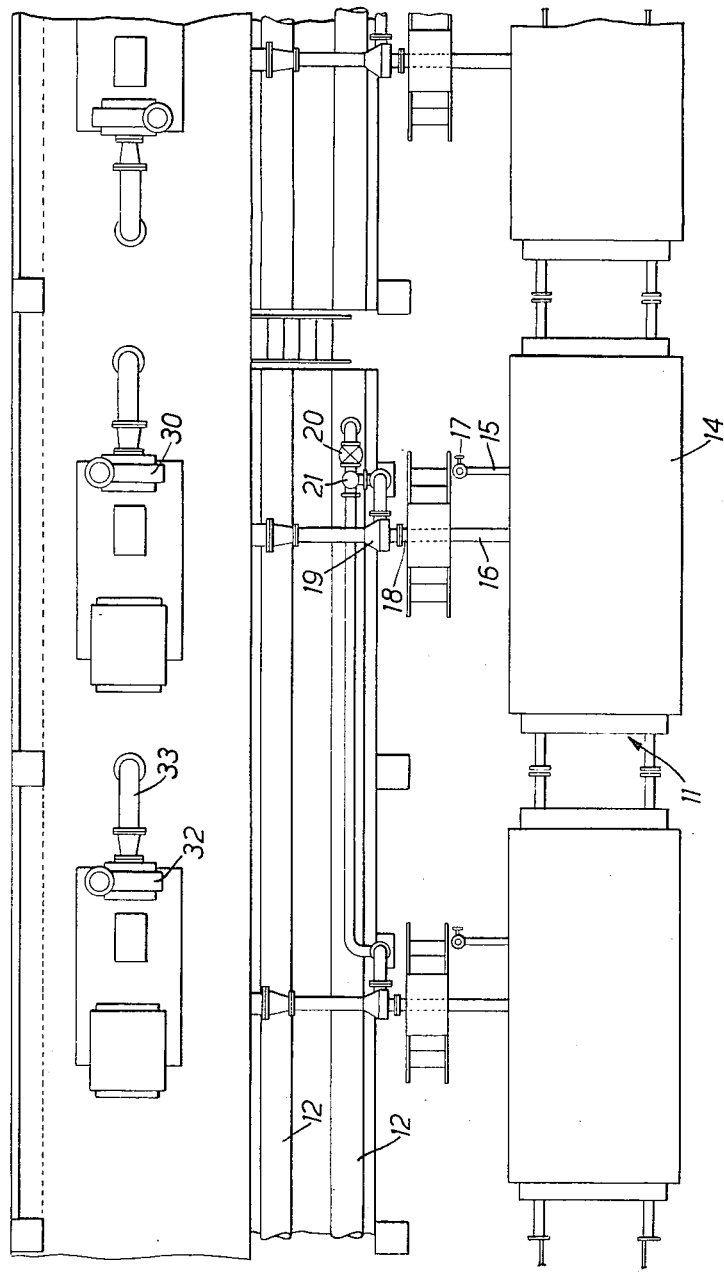
FIGURE 1 is a plan view, partly broken away, of part of an installation for removing flue dust from railway wagons and delivering it in the form of a slurry to the intakes of pumps.
Figure 2:
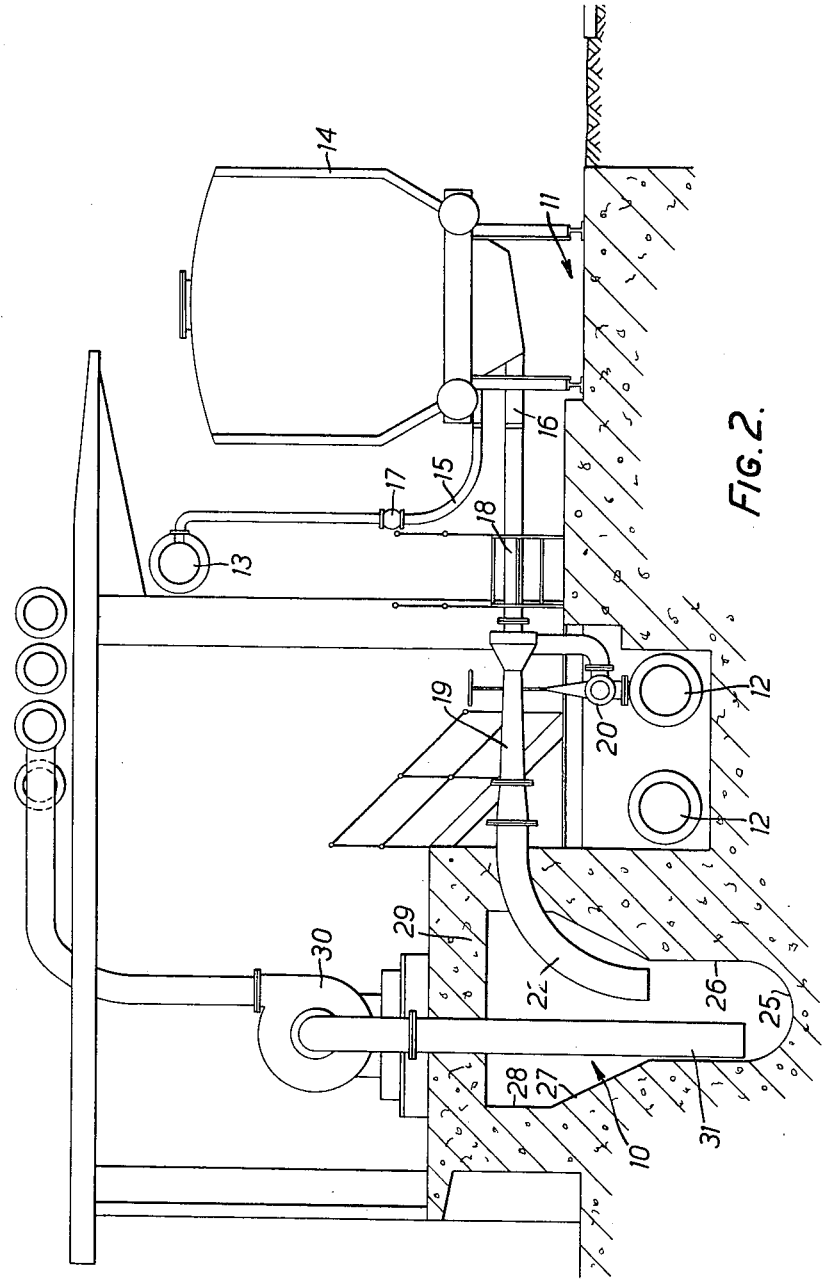
FIGURE 2 is a sectional elevation on the line 2—2 of FIGURE 1.

FIGURES 4 and 5 are enlarged sections as on the lines 4—4 and 5—5 of FIGURE 3 showing the cross-section of the trough at different points.

The invention is shown in the drawings as applied to the conveyance of slurry as part of the disposal of fly ash from power stations. The amount of flue dust or fly ash to be disposed of from a modern power station may be of the order of 5,000 tons per day. The dust in question is extremely light and it is necessary to ensure that it will not blow away in a cloud and constitute a nuisance by being deposited on surroundings over a large area. The dust may be loaded into special closed railway wagons and transported in them and the present invention will be described in connection with the collection of the dust from the railway wagons and its feeding as a slurry into a pipeline. The problem therefore, after the dust is unloaded from a train of wagons, and converted into a slurry, is to feed the slurry steadily and uniformly to a pump. Provided the slurry enters the pump reasonably uniformly, there is no great difficulty in delivering it for substantial distances, perhaps a mile or several miles, through a pipeline. If the powder is allowed to accumulate or settle, it may block the approaches to the pump, the pump or the pipeline.

The equipment is designed to unload half a train at a time, each train comprising perhaps forty wagons of a total length of about 900 feet. Accordingly the unloading station has a length of about 450 feet and comprises a pair of troughs 10, each about 200 feet long spaced end-to-end alongside a railway siding 11. A high pressure water ring main 12 and compressed air main 13 run alongside the siding and opposite each wagon 14 a pair of flexible hoses 15 and 16 are provided which can be connected to the wagon, the hose 15 supplying compressed air from the air main 13 through a valve 17 to the wagon to pressurise the contents of the wagon and the hose 16 receiving the dust and air from the wagon.

The dust hose 16 is connected through a pipe 18 to an ejector 19 which receives high pressure water from the high pressure ring main 12 through a valve 20 and a change-over cock 21 to entrain the dust, wet it and deliver it through a curved inlet pipe 22 into the trough. The equipments are arranged in pairs, each pair serving a pair of wagons, an odd numbered wagon and an even numbered wagon, a single water valve 20 and change-over cock 21 serving the two-ejectors so that as long as the valve is open there will be a flow through one or other ejector.

The section of the trough comprises a semi-circular bottom 25, a vertical sided lower portion 26 and an upper portion 27 diverging upwardly to a top vertical sided portion 28. The trough is covered by a cover 29.

In the region of the centre of the length of the trough suction pipes 31 from the inlets to two pumps 30 extend down into the trough to a point about level with the axis of the curved bottom portion 25. In addition suction pipes 33 of stand-by pumps 32 also extend into the trough.

The inlet pipes 22 from the ejectors are directed down into the trough so as to terminate below the liquid level in it. They are directed close to one wall of the trough so as to impart a tangential movement to the material in the trough, and are also inclined so as to impart a movement having a component parallel to the length of the trough towards the pump suction pipes at its centre. These are located near the opposite wall of the trough.

Between each pair of adjacent inlets there are provided water jets 35 and compressed air jets 36 directed in the same way as the inlets so as to maintain and assist the helical movement of the material in the trough, and also to effect some agitation.

Each trough has one or more overflow pipes 37. As shown in FIGURE 3 the curved bottom of each trough slopes gradually upwards from the middle towards each end, so that, as shown in FIGURE 5 at its end portion the lower vertical-sided part of it virtually disappears. As shown in FIGURE 4 the bottom curved portion of the trough section may be extended around rather more than a semi-circle as at 38 so as to encourage the helical movement in it, in which case the vertical sided portion may again disappear on one side. If necessary at selected positions the inner surface of the trough may be formed of or lined with special wear-resisting materials.

The arrangement described enables the dust to be mixed with the water to form a slurry, and enables the slurry to be kept in motion so as to prevent the dust settling out from it and to be fed steadily to the pumps whence it can be delivered over long distances by pipe-lines.

In operation the first half of the train is drawn up alongside the unloading station and the water flow is started. In a specific procedure teams of two operators attend to one group of wagons per team, and start by connecting up the hoses and turning on the air for each of the odd-numbered wagons in turn. While the odd-numbered wagons are emptying they turn on the air to the even-numbered wagons and when the first odd-numbered wagon is completely empty they change over the water change-over cock to each of the even-numbered wagons in turn, and disconnect the hoses. As each even-numbered wagon is emptied they stop the air and disconnect the hoses from it, after which the train is drawn forward so as to bring the other half opposite the unloading station, and the process is repeated. In this way a train of forty wagons can be emptied in about an hour.

In a modified arrangement in which a trough is situated between two sidings, inlets enter the trough from both sides, but their ends are of course all close to the same wall of the trough as indicated in chain lines at 40 in FIGURE 4.

It will be appreciated that during the operation described there is a continuous flow of liquid into each trough in such a direction as to impart a helical motion to its contents, and this motion is maintained and reinforced by jets of water and compressed air. In this way the ash is maintained in suspension so that it does not clog or settle into lumps or deposits which might tend to block either the pump inlets or the pipeline on their delivery side. During the intervals while dust valves are being operated so that the flow of ash from one wagon is replaced by flow from another, the flow of water is maintained and in addition the flow of slurry from other wagons is in general also maintained. It is essential to maintain an uninterrupted flow of water so as to ensure that the ash previously delivered will not settle, and to maintain this flow, after the delivery of ash has ceased, for a sufficiently long time to ensure that the ash will have been driven beyond the pumps and wholly or partly through the pipeline. Naturally it is desirable to minimise the amount of water which flows without usefully carrying ash and this is ensured by staggering the change-over from one wagon to another so that whilst the flow from one wagon is interrupted the flow from other wagons is maintained. This of course also economises in the use of man-power.

The ash is in general satisfactorily wetted by the water in the ejector but if in some circumstances dry ash should be delivered to the trough it is desirable that the inlet pipe should open below the liquid so as to minimise the chance of escape of dry ash. This is further favoured by the fact that the top of the trough is closed and widens out so as to provide a substantial space for settlement. It will be appreciated that the escape of even a comparatively small proportion of dry ash can constitute a nuisance, bearing in mind the total amount to be disposed of. Moreover, some variation in the volume delivered to the trough will occur, for example due to the change of volume when the liquid contains no solids, and the time taken for the subsequent supply of additional water from the make-up valves, operated automatically by a fall of level, to make up the volume. In order to maintain the flow through the pumps the trough affords a substantial store of liquid in its upper part and enables the pumps to continue delivering with a relatively small variation of liquid level.

Although the invention has been described as applied to the disposal of fly ash it will be appreciated that it may find other applications, for example to the conveyance of other material including sand or silt.

What we claim as our invention and desire to secure by Letters Patent is:

1. Apparatus for forming and conveying slurry in a generally horizontal direction comprising a generally horizontal trough for reception of the slurry, said trough having a curved bottom of generally cylindrical cross section, means for maintaining slurry in said trough at a pre-determined level including an overflow pipe communicating with the trough at said level and means for forming and delivering the slurry into said trough, said last-mentioned means comprising an ejector, means for entraining dust in an air stream and delivering the said air stream with its entrained dust into said ejector, conduit means communicating with the ejector for supplying water under pressure thereto in quantities for entraining said dust and forming a slurry of dust and water, an inlet pipe communicating with and extending from said ejector and having a discharge end opening downwardly into said trough at one side thereof below the said pre-determined level, said discharge end being directed generally tangentially to said curved bottom of the trough, and inclined to the axis thereof for producing a helical flow of slurry along the trough parallel to the axis of its said curved bottom in combination with a generally horizontal pipeline, pumping means including at least one pump having a delivery outlet connected to the said pipeline, a suction pipe having one end connected to the inlet of said pump and its other end communicating with the trough.

2. Apparatus as defined in claim 1, in which said other end of the suction pipe extends into the trough below the said pre-determined level, on the opposite side thereof from said discharge end of the inlet pipe and generally tangentially to the curved bottom of the trough.

References Cited by the Examiner

UNITED STATES PATENTS

| 1,958,561 | 5/1915 | Bennett | 302—14 |
| 1,908,220 | 5/1933 | Chapman | 302—15 |
| 1,990,446 | 2/1935 | Allen | 302—14 |
| 2,617,690 | 11/1952 | Addison | 302—25 |

FOREIGN PATENTS

| 170,971 | 3/1905 | Germany. |
| 361,724 | 5/1921 | Germany. |

SAMUEL F. COLEMAN, *Primary Examiner.*

ANDRES F. NIELSEN, *Examiner.*